United States Patent
Ludwig

(10) Patent No.: US 6,662,712 B2
(45) Date of Patent: Dec. 16, 2003

(54) METHOD OF AND APPARATUS FOR PROCESSING PSE MEAT

(75) Inventor: Wolfgang Ludwig, Kingston, NY (US)

(73) Assignee: Wolf-Tec Inc., Kingtson, NY (US)

(*) Notice: Subject to any disclaimer, the term of this patent is extended or adjusted under 35 U.S.C. 154(b) by 0 days.

(21) Appl. No.: 10/094,595

(22) Filed: Mar. 8, 2002

(65) Prior Publication Data

US 2002/0139254 A1 Oct. 3, 2002

Related U.S. Application Data

(60) Provisional application No. 60/272,019, filed on Mar. 22, 2001.

(51) Int. Cl.$^7$ .............................. A23L 1/00; A23L 1/31; A23L 3/34; A22C 9/00; A22C 17/00
(52) U.S. Cl. .............................. 99/535; 99/472; 99/487; 99/517
(58) Field of Search .................... 99/472, 516, 517, 99/532–535, 467, 487, 348; 366/110, 139, 144, 219, 233, 235, 279, 292–296, 309–313, 325.1, 325.92; 426/231, 519, 641, 524, 266, 281; 452/141

(56) References Cited

U.S. PATENT DOCUMENTS

| | | | | |
|---|---|---|---|---|
| 3,934,860 A | * | 1/1976 | Michels et al. | ........... 99/535 X |
| 4,517,888 A | * | 5/1985 | Gould | ........................ 99/472 |
| 5,405,630 A | * | 4/1995 | Ludwig | ...................... 426/231 |
| 5,564,332 A | * | 10/1996 | Ludwig | ........................ 99/472 |
| 5,972,398 A | * | 10/1999 | Ludwig et al. | ........... 99/532 X |

* cited by examiner

Primary Examiner—Timothy F. Simone
(74) Attorney, Agent, or Firm—Herbert Dubno

(57) ABSTRACT

Pale, soft and exudative parts of bodies of meat are rendered substantially indistinguishable from other parts of the meat bodies by massaging a brine or marinade into the meat utilizing a paddle massager in which the lifting sides of the paddle are provided with formations, e.g bars, which promote the lifting action. The opposite sides of the paddles may remain smooth.

12 Claims, 3 Drawing Sheets

METHOD OF AND APPARATUS FOR PROCESSING PSE MEAT

CROSS REFERENCE TO RELATED APPLICATION

This is a nonprovisional application corresponding to 60/272,019 filed Mar. 22, 2001.

FIELD OF THE INVENTION

The present invention relates to a method of and to an apparatus for the processing of PSE meat.

BACKGROUND OF THE INVENTION

Pale, soft and exudative (PSE) meat is frequently encountered in the processing of bodies of meat such as hams utilizing massaging equipment. This kind of meat often arises because of the denaturing effect of lactic acid and poses a particular problem in fresh killed meat where it is in stark contrast to the much firmer darker colored portions.

It has become a widespread practice to treat bodies of meat by contacting the meat with a marinade, brine or, more generally, a treatment solution and then massaging the treating solution into the bodies of meat in a drum which can be provided with paddles to distribute the treating solution in the meat.

In particular, a body of meat which may contain meat of normal texture and firmness can also include portions which are classified as PSE and will not pick up or effectively distribute such treating solutions or react to the massaging action in a positive manner. The result may be a nonuniform distribution of the solution in the meat and portions of the body of meat which remain of pale color because of the lack of hemoglobin, which are exudative and soft and which give the appearance and feel of denatured or spoiled meat.

OBJECTS OF THE INVENTION

It is the principal object of the present invention to provide an improved method of and apparatus for the treatment of PSE meat.

SUMMARY OF THE INVENTION

I have discovered that PSE meat can be effectively treated with the result that such meat has a more normal and appetizing appearance, can take up a treating liquid such as a pickle, inject or marinade in a manner equivalent to that of normal needs and will blend in appearance with normal muscle tissue of bodies of meat such as a ham, if the massaging action in a paddle type massager is supplemental by an agitation or repetitive impact treatment imparted to the meat by projections on the massaging paddles. The preferred mode of applying the treating liquid to the body of meat is by injection. In some cases the massaging is effected before injection of the liquid into the meat or both before and after injection.

More particularly, I have found that when at least on the lifting side of such paddles in a paddle type massager, bars or like projections are provided, the PSE portions of a body of meat can be treated with the liquid to be massaged into the meat in a highly effective manner. The impacts provided by the PSE bars serve also to tenderize the firmer portions and promote mixing between the PSE and firmer portions.

For example, in the case of hams which have normal muscle tissue which is relatively firm as well as PSE portions, the bars or formations provided on the paddles are seen, during the massaging action, to impart to the body of meat an action which appears to distribute hemoglobin in the body of the meat more uniformly and to effectively treat both the normal muscle tissue and the PSE portions so that the texture throughout the body is substantially homogeneous and the treating liquid distributes homogeneously as well. Surprisingly, when the massaging action continues until the product is substantially dry, the portions which formerly were somewhat exudative, no longer tend to exude liquid. In fact, the portions formerly considered to be PSE are no longer recognizable as such in the treated body of meat. The invention is applicable to all meat which can be classified as PSE and any bodies of meat which can be treated in a paddle massager. The massaging can be carried with the meat being chilled or preferably warmed to a temperature of 45° C. to 60° C. for the massaging and then chilled.

According to a feature of the invention the bars are provided only on one side of each paddle and the shaft of the massager is driven in one direction to treat the PSE containing body of meat with the impacts produced by the PSE bars. The shaft is then rotated in the opposite sense to finish the massaging treatment using only the smooth sides of the paddles.

The meats treated, the solutions used and the operating conditions may correspond to those in copending application Ser. No. 09/808,398 which is hereby incorporated by reference (see also U.S. Pats. Nos. 5,564,332, 5,405,630 and 5,972,398).

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
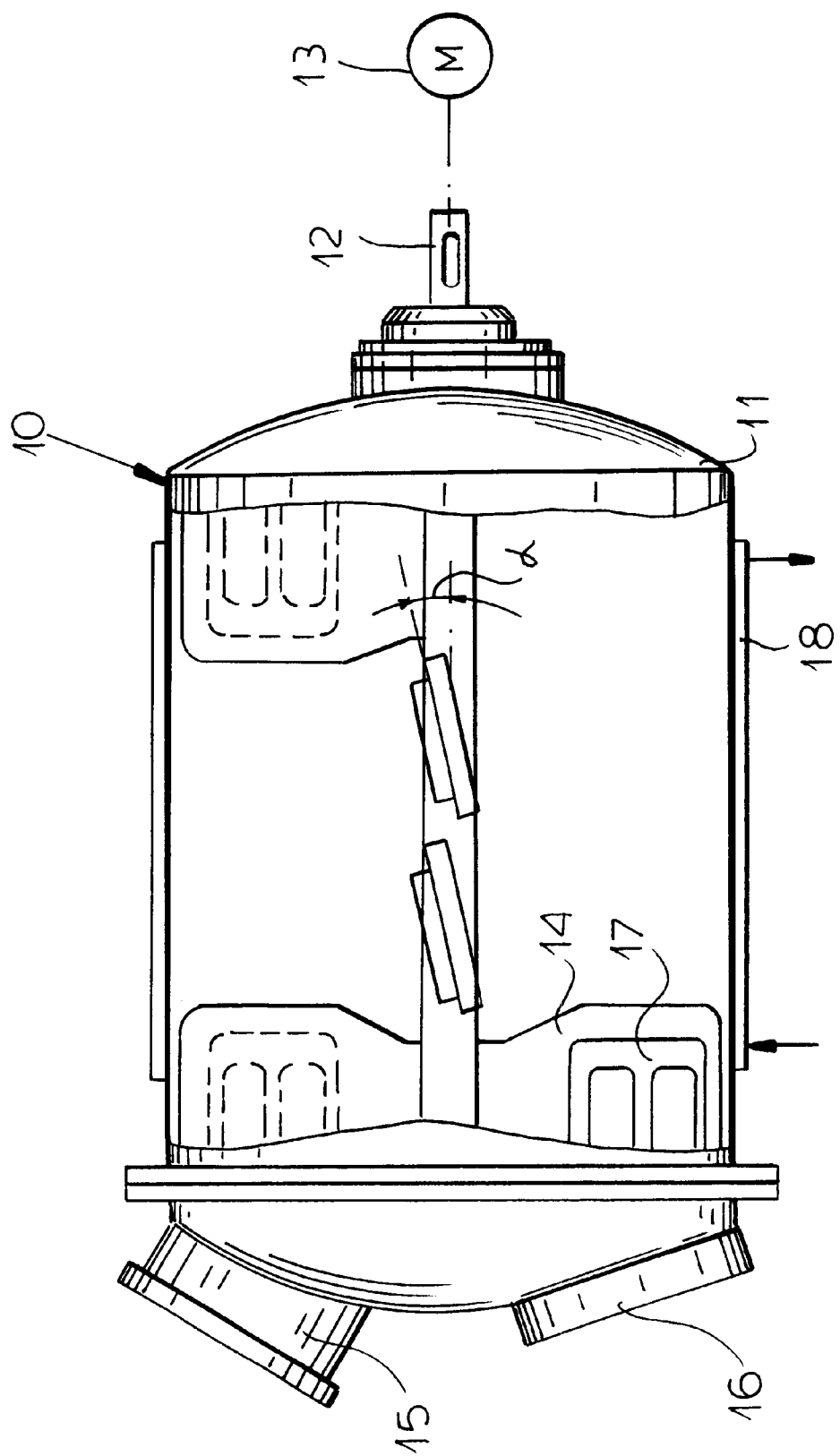
FIG. 1 is a diagrammatic section through a paddle massager according to the invention.

FIG. 1 shows a massaging apparatus 10 which comprises a drum 11 having a shaft 12 driven by a motor 13 and provided with paddles 14 which can, as shown at α in FIG. 1, be inclined to the shaft axis.

The drum 11 has an inlet port 15 through which the bodies of meat can be introduced and a discharge opening 16.

Figure 4:
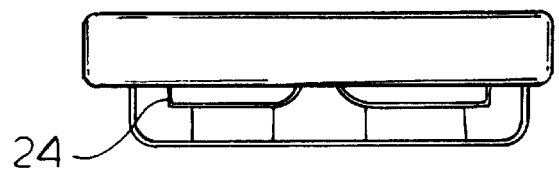
FIG. 4 is a top view of the paddle provided with the PSE bars.
Figure 3:
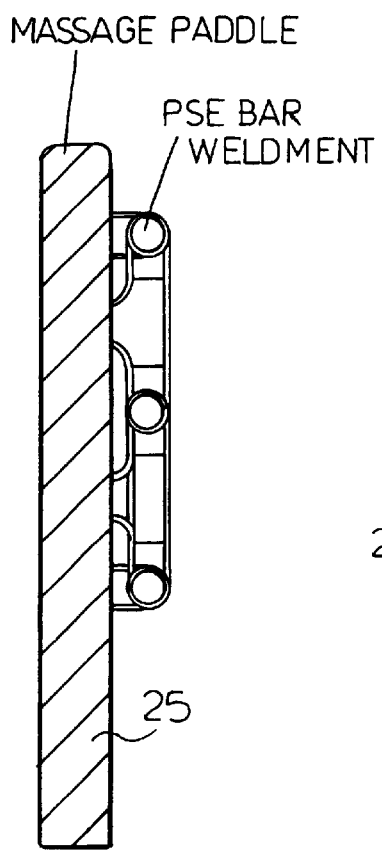
FIG. 3 is a cross sectional view taken along the line III—III of FIG. 2.
Figure 2:
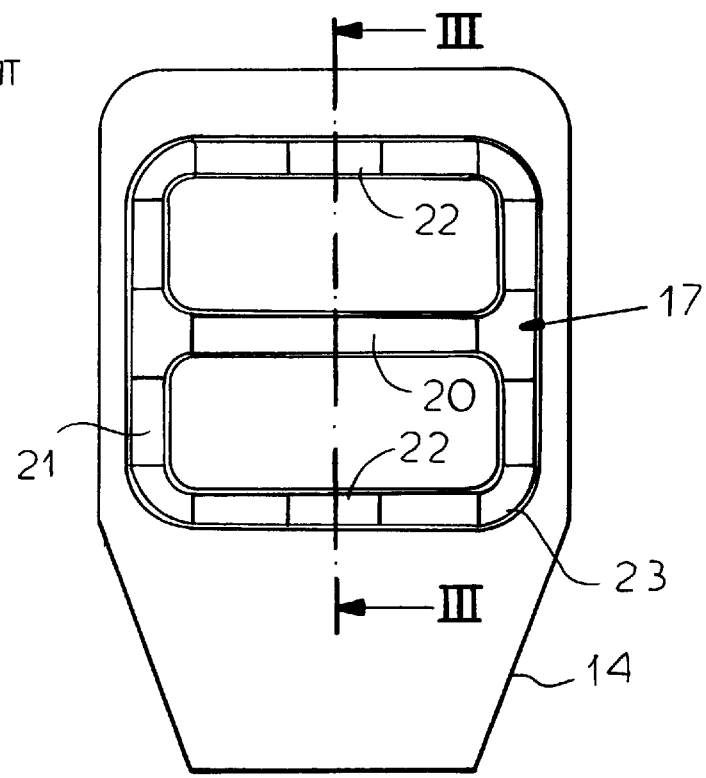
FIG. 2 is an elevational view of a paddle of the massager seen from the side provided with the PSE bars according to the invention.

The paddles are so rotated that their lifting surfaces are formed with so-called PSE bars 17 shown in greater detail in FIGS. 2 to 4. The opposite side of each paddle is smooth. Conventionally both sides of each paddle are smooth.

The drum 11 can be provided with a jacket 18 through which a coolant or a heating liquid can be circulated.

Figure 7:
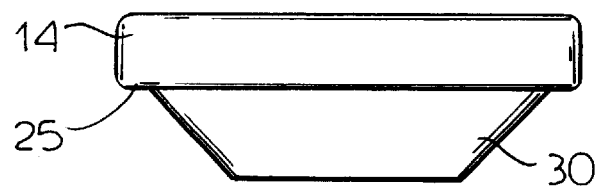
FIG. 7 is a top view of this paddle.
Figure 6:
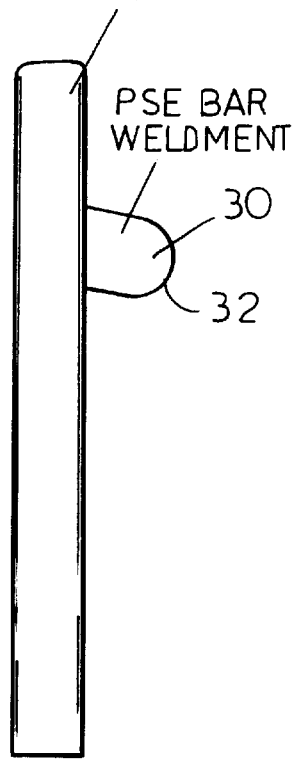
FIG. 6 is a side view of the paddle of FIG. 5.
Figure 5:
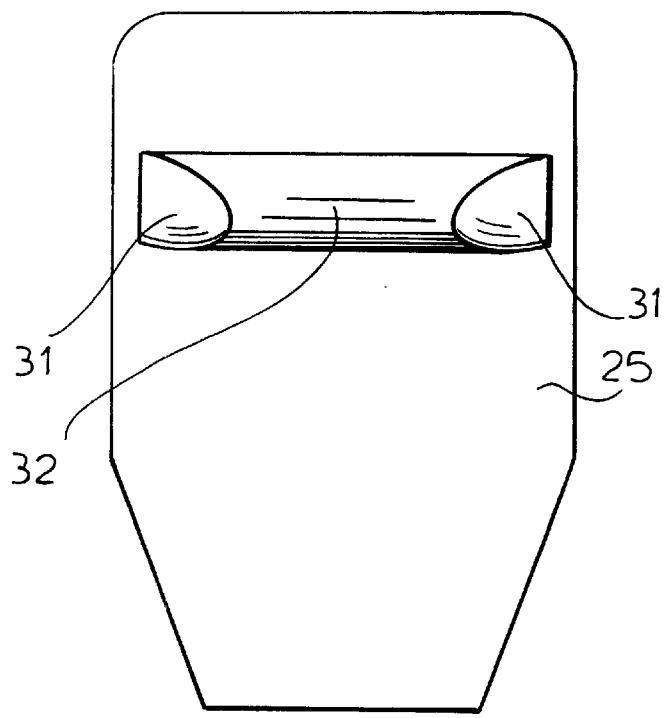
FIG. 5 is a view similar to FIG. 2 of another paddle.

In the embodiment of FIGS. 2 to 4, the PSE bars 17 are formed by bar segments 20 and 21 joined together by the segments 22 and corner segments 23, all welded together and provided with posts 24 which are welded to one face 25 of the paddle 14. The bars in the embodiment of FIGS. 2 to 4 have a figure-eight configuration. In the embodiment of FIGS. 5 to 7, a single bar 30 is provided on the face 25 of the paddle 14 and is inclined to that face as shown in FIG. 6. The ends of the bar converge inwardly at 31 and the bar has a rounded edge 32 remote from the side welded to the surface 25.

I claim:

1. An apparatus for processing bodies of pale, soft and exudative meat, comprising:
   a paddle-massager drum adapted to receive a treatment liquid capable of being massaged into bodies of meat received in the drum;
   a rotatable shaft extending through said drum;
   a plurality of paddles projecting generally radially from said shaft and engageable with said bodies of meat for massaging said liquid into said meat upon rotation of said shaft; and
   at least one formation on one side of each of said paddles facilitating lifting of said bodies of meat as said shaft is rotated, each of said formations comprising at least one bar protecting from a surface of said paddle.

2. The apparatus defined in claim 1 wherein the opposite side of each of said paddles is substantially smooth.

3. The apparatus defined in claim 1 wherein each of said formations comprises a plurality of bars supported on the respective said surface but parallel to and spaced from the respective surface.

4. The apparatus defined in claim 3 wherein each of said plurality of bars comprises three parallel bars connected at their ends.

5. The apparatus defined in claim 1 wherein said drum and said shaft are generally horizontal.

6. An apparatus for processing bodies of pale, soft and exudative meat comprising:
   a generally horizontal paddle-massager drum adapted to receive a treatment liquid capable of being massaged into bodies of meat received in the drum;
   a jacket for said drum through which a heating or cooling liquid is circulated;
   a rotatable shaft extending through said drum;
   a plurality of paddles projecting generally radially from said shaft and engageable with said bodies of meat for massaging said liquid into said meat upon rotation of said shaft; and
   at least one formation on one side of each of said paddles facilitating lifting of said bodies of meat as said shaft is rotated, each of said formations comprising at least one bar projecting from a surface of said paddle.

7. The apparatus defined in claim 6 wherein said bar is inclined to said surface.

8. The apparatus defined in claim 6 wherein said bar has rounded surfaces.

9. The apparatus defined in claim 6 wherein each of said formations comprises a plurality of bars supported on the respective said surface but parallel to and spaced from the respective surface.

10. The apparatus defined in claim 9 wherein each plurality of bars has generally a FIG. 8 configuration.

11. The apparatus defined in claim 10 wherein the opposite side of each of said paddles is substantially smooth.

12. The apparatus defined in claim 11 wherein each of said paddles lies substantially in a plane at an angle to an axis of said shaft.

* * * * *